US008492456B2

(12) United States Patent
Chen et al.

(10) Patent No.: US 8,492,456 B2
(45) Date of Patent: Jul. 23, 2013

(54) INK COMPOSITIONS FOR INK-JET PRINTING

(75) Inventors: Xiaohe Chen, San Diego, CA (US); George M. Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1246 days.

(21) Appl. No.: 10/775,660

(22) Filed: Feb. 9, 2004

(65) Prior Publication Data

US 2005/0176848 A1   Aug. 11, 2005

(51) Int. Cl.
*C08F 220/04* (2006.01)
*C08G 18/08* (2006.01)
*C08G 18/28* (2006.01)
*C08G 18/80* (2006.01)
*C08G 73/10* (2006.01)
*C08J 3/00* (2006.01)
*C08K 3/20* (2006.01)
*C08K 5/05* (2006.01)
*C08K 5/34* (2006.01)
*C08K 5/48* (2006.01)
*C08K 5/3445* (2006.01)
*C08L 75/00* (2006.01)
*C09D 5/00* (2006.01)
*C09D 11/00* (2006.01)

(52) U.S. Cl.
USPC ........... 523/160; 106/31.6; 106/31.85; 347/1; 347/2; 347/85; 347/86; 347/100; 523/161; 524/86; 524/104; 524/106; 524/379; 524/386; 524/589; 524/590; 524/591; 524/839; 524/840

(58) Field of Classification Search
USPC ....... 523/160, 161; 106/31.6, 31.85; 524/589, 524/590, 591, 839, 840, 86, 104, 106, 379, 524/386; 347/1, 2, 85, 86, 95, 100
See application file for complete search history.

(56) References Cited

U.S. PATENT DOCUMENTS

| | | | |
|---|---|---|---|
| 5,085,698 A * | 2/1992 | Ma et al. ........................ 524/388 |
| 5,156,675 A | 10/1992 | Breton et al. |
| 5,286,286 A | 2/1994 | Winnik et al. |
| 5,498,690 A | 3/1996 | Kim et al. |
| 5,626,840 A | 5/1997 | Thomaides et al. |
| 5,648,405 A * | 7/1997 | Ma et al. ........................ 523/160 |
| 5,696,182 A * | 12/1997 | Kashiwazaki et al. ........ 523/161 |
| 5,700,851 A | 12/1997 | Banning et al. |
| 5,716,435 A | 2/1998 | Aida et al. |
| 5,786,410 A | 7/1998 | Foucher et al. |
| 5,833,743 A * | 11/1998 | Elwakil ....................... 106/31.27 |
| 5,840,898 A | 11/1998 | Fang et al. |
| 5,928,419 A | 7/1999 | Uemura et al. |
| 5,973,062 A | 10/1999 | Harris et al. |
| 6,031,024 A | 2/2000 | Uraki et al. |
| 6,063,834 A | 5/2000 | Kappele et al. |
| 6,102,998 A * | 8/2000 | Iu et al. ........................ 106/31.58 |
| 6,136,890 A | 10/2000 | Carlson et al. |
| 6,140,017 A | 10/2000 | Koshimura et al. |
| 6,162,863 A | 12/2000 | Ramalingam |
| 6,235,099 B1 | 5/2001 | Aida et al. |
| 6,335,003 B1 | 1/2002 | Kim et al. |
| H2113 H * | 2/2002 | Nichols et al. ................. 523/160 |
| 6,372,876 B1 | 4/2002 | Kim et al. |
| 6,398,357 B1 | 6/2002 | Holloway et al. |
| 6,398,858 B1 | 6/2002 | Yu et al. |
| 6,451,103 B1 | 9/2002 | Uemura et al. |
| 6,455,611 B1 | 9/2002 | Pears et al. |
| 6,494,943 B1 | 12/2002 | Kinney et al. |
| 6,500,248 B1 | 12/2002 | Hayashi |
| 6,506,245 B1 | 1/2003 | Yu et al. |
| 6,521,031 B2 | 2/2003 | Kimura et al. |
| 6,540,821 B2 | 4/2003 | Adamic et al. |
| 6,543,888 B2 | 4/2003 | Nishita |
| 6,908,185 B2 * | 6/2005 | Chen et al. ........................ 347/96 |
| 2001/0020056 A1 | 9/2001 | Yamanouchi et al. |
| 2001/0021440 A1 | 9/2001 | Hanmura et al. |
| 2001/0029870 A1 | 10/2001 | Uemura et al. |
| 2001/0036979 A1 | 11/2001 | Yamanouchi et al. |
| 2001/0045176 A1 | 11/2001 | Kimura et al. |
| 2002/0017217 A1 | 2/2002 | Mizukawa et al. |
| 2002/0019458 A1 * | 2/2002 | Hirasa et al. ................. 523/160 |
| 2002/0060727 A1 | 5/2002 | Nishita |
| 2002/0067399 A1 | 6/2002 | Yabuki et al. |
| 2002/0067402 A1 | 6/2002 | Nishita |
| 2002/0077384 A1 | 6/2002 | Sano et al. |
| 2002/0077385 A1 | 6/2002 | Miyabayashi |
| 2002/0107301 A1 | 8/2002 | Yamanouchi et al. |
| 2002/0112643 A1 | 8/2002 | Tyvoll et al. |
| 2002/0122922 A1 | 9/2002 | Yamada et al. |
| 2002/0134280 A1 | 9/2002 | Naruse |
| 2002/0135650 A1 | 9/2002 | Nagai et al. |
| 2002/0143079 A1 | 10/2002 | Yamanouchi et al. |
| 2002/0175983 A1 | 11/2002 | Ishikawa et al. |
| 2002/0198287 A1 | 12/2002 | Ohta et al. |
| 2003/0015120 A1 | 1/2003 | Adamic et al. |
| 2003/0029355 A1 | 2/2003 | Miyabayashi |
| 2003/0078320 A1 | 4/2003 | Yatake |

(Continued)

FOREIGN PATENT DOCUMENTS

EP   0 616 017 A2   9/1994
EP   0 619 111   12/1996

(Continued)

OTHER PUBLICATIONS

Translation of JP OA reason for rejection dated Aug. 4, 2009.

*Primary Examiner* — Patrick Niland

(57) ABSTRACT

The present invention provides ink compositions for ink-jet printing. The ink compositions comprise by weight from about 0.1 to 5% by weight of a water-soluble polyurethane; from about 0.1 to 15% by weight of a 1,2-alkyldiol having 5-9 carbon atoms; and from about 0.5 to 6% by weight of a pigment. The present invention also provides a process for printing an image on a print medium that comprises applying an inventive ink composition thereto by means of an ink-jet printer. The present invention further provides ink-jet cartridges containing inventive ink compositions.

23 Claims, No Drawings

U.S. PATENT DOCUMENTS

| | | | |
|---|---|---|---|
| 2003/0184629 A1* | 10/2003 | Valentini et al. | 347/100 |
| 2004/0035319 A1* | 2/2004 | Yeh et al. | 106/31.6 |
| 2004/0110867 A1* | 6/2004 | McCovick | 523/160 |
| 2004/0242726 A1* | 12/2004 | Waki et al. | 523/160 |
| 2005/0020730 A1* | 1/2005 | Valentini et al. | 523/160 |
| 2005/0139124 A1 | 6/2005 | Ito et al. | |

FOREIGN PATENT DOCUMENTS

| | | |
|---|---|---|
| EP | 0 835 890 A1 | 4/1998 |
| EP | 1 203798 | 5/2002 |
| EP | 1 308488 | 5/2003 |
| EP | 1308488 | 5/2003 |
| JP | 5-214284 A | 8/1993 |
| JP | 10-168151 A | 6/1998 |
| JP | 11-323235 A | 11/1999 |
| JP | 2003-313479 A | 11/2003 |
| JP | 2004-25634 A | 1/2004 |
| JP | 2004-300393 A | 10/2004 |
| JP | 2004-315751 A | 11/2004 |
| JP | 2005-47989 A | 2/2005 |
| JP | 2005-54158 A | 3/2005 |
| JP | 6-279818 A | 10/2006 |
| WO | WO 02/31443 | 4/2002 |
| WO | WO 03/097753 A1 * | 11/2003 |

* cited by examiner

INK COMPOSITIONS FOR INK-JET PRINTING

BACKGROUND

The ink-jet printing process involves the ejection of fine droplets of ink onto a print medium such as paper in response to electrical signals generated by a microprocessor. Typically, an ink-jet printer utilizes a set of cartridges mounted on a carriage that is moved relative to the surface of a print medium.

Each cartridge includes a print head with an orifice plate that has small nozzles through which the ink droplets are ejected. Adjacent to these nozzles is an ink chamber where ink is stored prior to ejection. Ink drop ejection is typically achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink vapor that forces a drop of ink through the associated nozzle onto the print medium. In piezoelectric ink-jet printing, ink droplets are ejected due to the vibrations of piezoelectric crystals stimulated by electrical signals generated by the microprocessor.

The ink compositions used in ink-jet printing typically employ water, colorants, surfactants and water-miscible organic co-solvents. The colorants that may be employed include dyes or pigments.

Once an ink has been deposited on a print medium it takes a certain time for the printed image to dry. Drying is driven in part by evaporation and in part by absorption into the print medium. Short "drytimes" are generally preferred in the printing industry as they reduce surface bleed, reduce the potential for smudging, and shorten the overall print time.

The drytime of an image is influenced by a number of factors that include the chemical composition of the deposited ink and the physical and chemical characteristics of the print medium. In particular, the rate at which an ink is absorbed into a print medium is affected by the surface tension and viscosity of the ink. Inks with low surface tension and viscosity are absorbed more quickly into print media. Surfactants reduce the surface tension of inks and are therefore added for this purpose to most ink compositions. However, reducing the surface tension and viscosity of an ink also affects the jet velocity, droplet separation length, drop weight and stream stability of the ink. This is particularly true when inks are ejected at high frequencies, i.e., at high printing speeds. For example, inks with low surface tensions (e.g., less than about 30 dynes/cm) do not have the ability to fire normal drop weights at high frequencies—the drop weight usually decreases more than 50% at firing frequencies above 20 kHz. As a consequence, inks with short drytimes tend to lack stability at high firing frequencies while inks that are stable at high firing frequencies tend to exhibit long drytimes. This currently limits the speed of ink-jet printers. There is therefore a need in the art for ink compositions that are stable at high ejection frequencies and exhibit short drytimes when deposited on a print medium.

SUMMARY

The present invention provides ink compositions for ink-jet printing. The ink compositions comprise by weight from about 0.1 to 5% by weight of a water-soluble polyurethane; from about 0.1 to 15% by weight of a 1,2-alkyldiol having 5-9 carbon atoms; and from about 0.5 to 6% by weight of a pigment. The present invention also provides a process for printing an image on a print medium that comprises applying an inventive ink composition thereto by means of an ink-jet printer. The present invention further provides ink-jet cartridges containing inventive ink compositions.

DESCRIPTION OF CERTAIN PREFERRED EMBODIMENTS

The invention will now be described with particular reference to certain preferred embodiments of the ink compositions of the invention. In general, the ink compositions comprise, by weight (all percents are by weight based on the total weight of the ink unless otherwise indicated) from 0.1 to 5%, preferably from 0.5 to 3% of one or more water-soluble polyurethanes; from 0.1 to 15%, preferably from 1 to 8% of one or more 1,2-alkyldiols; and from 0.5 to 6%, preferably from 2 to 4% of one or more pigments. The remainder of the ink compositions is mostly water or a mixture of water and one or more water-miscible organic co-solvents. In addition other components such as biocides that inhibit growth of microorganisms, chelating agents that eliminate deleterious effects of heavy metal impurities, buffers, antioxidants, ultraviolet absorbers and rheology modifiers may be optionally added to improve various properties of the ink compositions. In certain embodiments the inventive ink compositions may be free of surfactants, e.g., the anionic and/or non-ionic surfactants that are traditionally added to ink compositions. Without limitation, the inventors have found that the inventive inks are stable at high ejection frequencies and exhibit short drytimes when deposited on print media.

Polyurethanes

The ink compositions include from 0.1 to 5%, preferably from 0.5 to 3% water-soluble polyurethane. In certain embodiments the ink compositions may include a mixture of two or more different polyurethanes, e.g., 2, 3, 4 or 5 different polyurethanes. The term "water-soluble polyurethane" as used herein encompasses all water-soluble polymers having the formula (I):

$$R^{1'}-(X-R^1)_n-X-R^{1'} \qquad (I)$$

where $n \geq 1$; each X is a urethane group having the formula —NHC(O)O— or —O(O)CNH—; $R^1$ and $R^{1'}$ are multivalent and monovalent organic groups, respectively; and each $R^1$ or $R^{1'}$ group may be the same or different. Although not shown in formula (I), additional $R^{1'}$ groups will be necessary for branched polyurethanes that include one or more $R^1$ groups with a valency of three or more. In preferred embodiments each $R^1$ group is divalent and the polyurethane is unbranched. Each $R^1$ and $R^{1'}$ group is independently selected from the group consisting of monomeric and polymeric aliphatic and aromatic groups. Each $R^1$ and $R^{1'}$ group can be optionally substituted with a halogen (e.g., fluorine), and can optionally contain one or more heteroatoms, the heteroatom being situated, e.g., as a divalent oxygen, a carbonyl oxygen, a trivalent nitrogen, or a divalent sulfur.

In preferred embodiments, certain $R^1$ and/or $R^{1'}$ groups may contain one or more ionic groups pendant from the backbone of the polymer, e.g., one or more ionic groups that increase the water-solubility of the polymer. Suitable ionic groups include carboxylate groups (—COOM, where M is a monovalent cation such as a metal ion (e.g., $Na^+$, $K^+$, $Li^+$, etc.), $H^+$, $NH_4^+$, etc.), phosphate groups (—$OPO_3M_2$), phosphonate groups (—$PO_3M_2$), sulfonate groups (—$SO_3M$), quaternary ammonium groups (—$NH_3Y$, where Y is a monovalent anion such as $Cl^-$ or $OH^-$), or any other effective ionic group.

For the purposes of the present invention, a polyurethane polymer is said to be "water-soluble" if it has a water-solubility limit at 25° C. of at least 0.1%, preferably at least 5%, especially at least 10%. It is to be understood that any polyurethane of formula (I) that meets these water-solubility requirements may be used in an ink composition of the present invention. In certain preferred embodiments, the water-soluble polyurethane(s) that are included in the ink compositions have a weight average molecular weight (MW) that is less than about 15,000 Da, preferably in the range of about 4,000 to 10,000 Da, especially 4,000 to 7,000 Da and an acid number (AN) in the range of about 30 to 70, preferably about 40 to 60.

Exemplary water-soluble polyurethanes may be prepared according to the methods that are taught in U.S. Pat. No. 6,372,876, the contents of which are incorporated herein by reference. In particular, as disclosed therein, suitable polyurethanes may be prepared from components:

(a) at least one compound which contains two or more active hydrogen atoms per molecule;

(b) at least one diol containing acid or salt groups; and (c) at least one diisocyanate with a glass transition temperature of at least 15° C. and an acid number in the range of about 12 to 150, preferably 30 to 90.

Examples of suitable compounds that may be used as component (a) are diols, diamines, polyesterols, polyetherols and mixtures thereof. Preferred diols and polyetherols include ethylene glycol, neopentyl glycol, diethylene glycol, triethylene glycol, tetraethylene glycol, pentaethylene glycol and hexaethylene glycol. Suitable polyesterdiols include those prepared from α-hydroxy carboxylic acids and those that are typically used for the preparation of polyurethanes, in particular the reaction products of phthalic acid and diethylene glycol; isophthalic acid and 1,4-butanediol; isophthalic acid and 1,6-hexanediol; adipic acid and 1,6-hexanediol; or adipic acid and ethylene glycol. Suitable diamines are, for example, ethylenediamine, propylenediamine, 1,4-diaminobutane, 1,6-diaminohexane, and α,ω-diamines which can be prepared by amination of polyalkylene oxides with ammonia.

Component (b) includes in general one or more diols containing acid or salt groups. In certain preferred embodiments the one or more diols may contain two acid or salt groups. As taught in U.S. Pat. No. 6,372,876 dimethylolpropanoic acid or a compound of formula (II) or (III) are of particular interest:

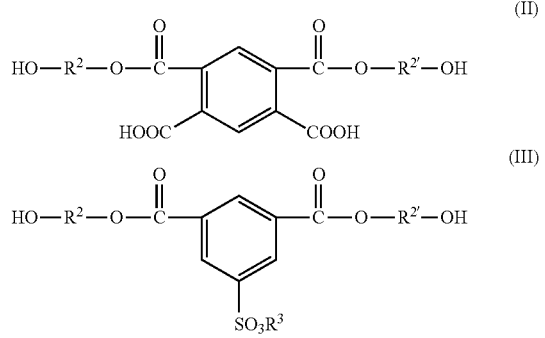

where $R^2$ and $R^{2'}$ are each independently $C_{2-18}$ alkylene groups, preferably $C_{2-8}$ alkylene groups, and $R^3$ is Na or K.

Component (c) is generally as defined above and, in particular, hexamethylene diisocyanate, isophorone diisocyanate, and/or toluylene diisocyanate.

Exemplary water-soluble polyurethanes may also be prepared according to the methods that are taught in U.S. Pat. No. 5,626,840, the contents of which are incorporated herein by reference. In particular, suitable polyurethanes may be prepared from components (a) and (c) as described above and component (b) that is defined as a 2,2-hydroxymethyl-substituted carboxylic acid having the formula (IV):

where $R^4$ is a hydrogen atom or a $C_{1-20}$ alkyl group. Exemplary compounds that may be used in components (a) and (c) are generally as described above for U.S. Pat. No. 6,372,876. Exemplary compounds that may be included in component (b) include 2,2-di-(hydroxymethyl)acetic acid, 2,2-di-(hydroxymethyl)propionic acid, 2,2-di-(hydroxymethyl)butyric acid, 2,2-di-(hydroxymethyl)pentanoic acid, and the like. The preferred acid is 2,2-di-(hydroxymethyl)propionic acid.

Generally, the polyurethanes are obtained by reacting the compounds of components (a) and (b) with the compounds of component (c) under an inert atmosphere in an inert solvent with or without urethane reaction catalysts known in the art. The reaction is typically performed at temperatures in the range of 70 to 130° C. The extent of the polymerization reaction can, where appropriate, be carried out in the presence of chain extenders and quenchers in order to control the final molecular weights of the polymers. Quenchers are typically monofunctional active hydrogen-containing compounds (e.g., amines or alcohols such as ethanol). As is customary in the preparation of polyurethanes, the components [(a)+(b)]:(c) are advantageously used in the molar ratio from about 0.7:1.0 to 1.3:1.0, preferably about 0.8:1.0 to 1.2:1.0, especially about 0.9:1.0 to 1.1:1.0. The acid number of the resulting polyurethane is determined by the composition and the concentration of the compounds of component (b) in the mixture of components (a) and (b). Reference is made to D. Dietrich, Progress in Organic Coatings, 9:281-340 (1981), "Aqueous Emulsions, Dispersions and Solutions of Polyurethanes: Synthesis and Properties," and J. W. Rosthauser & K. Nachtkamp, Adv. Urethane Science & Technology, p. 121 (1987), "Waterborne Polyurethanes" for additional details on common polymerization techniques that may be used.

It is to be understood that the ink compositions of the present invention may include water-soluble polyurethanes that are made by other methods. It will also be appreciated that suitable polyurethane polymers are available commercially. In particular, the polyurethane that is sold by BASF under the trade name LUVISET® PUR may be used or the polyurethane that is sold by Avecia under the trade name NBZ 3570/60.

In general, polyurethanes containing acid groups will be partially or fully neutralized within an ink composition using one or more bases. In certain embodiments the polyurethanes may be neutralized by titrating the ink composition to a pH in the range of 8 to 10, preferably 8.5 to 9.5. Any base or basic buffer that can adjust the pH within that range may be used. For example, bases that can be used for the neutralization of the polyurethanes include alkali metal bases, such as sodium hydroxide solution, potassium hydroxide solution, sodium carbonate, sodium hydrogencarbonate, potassium carbonate or potassium hydrogencarbonate, and alkaline earth metal bases, such as calcium hydroxide, calcium oxide, magnesium hydroxide or magnesium carbonate, and ammonia and amines. In certain embodiments neutralization can be performed using organic bases such as 2-amino-2-methylpropanol, diethylaminopropylamine or triisopropanolamine. The neutralization of the polyurethanes containing acid groups can also be carried out using mixtures of two or more bases, e.g., mixtures of sodium hydroxide solution and triisopropanolamine. Suitable basic buffers include TRIZMA®, TRICINE®, 2-amino-2-methyl-1,3-propanediol (AMPD), 3-([1,1-dimethyl-2-hydroxyethyl]amino)-2-hydroxypropanesulfonic acid (AMPSO), 2-(cyclohexylamino)ethanesulfonic acid (CHES), etc. all of which are available from Sigma-Aldrich.

1,2-Alkyldiols

The ink compositions include from 0.1 to 15%, preferably from 1 to 8% of one or more 1,2-alkyldiols having 5-9 carbon atoms, preferably 5-7 carbon atoms, especially 5-6 carbon atoms. 1,2-hexanediol, 1,2-pentanediol and mixtures thereof are preferred 1,2-alkyldiols for use in ink compositions of the present invention with 1,2-hexanediol being particularly preferred.

Pigments

The ink compositions include from 0.5 to 6%, preferably from 2 to 4% pigment. In certain embodiments the ink compositions may include a mixture of two or more pigments, e.g., 2, 3 or 4 different pigments.

As used herein, the term "pigment" refers to a colorant that is insoluble in the ink composition. The pigment may be black or colored. A wide variety of organic and inorganic pigments, alone or in combination, may be selected to make the ink composition. The pigment particles should be sufficiently small to permit free flow of the ink through the ink-jet printing device, especially at the ejecting nozzles that usually have a diameter ranging from 10 micron to 50 micron. Without limitation, the pigment particle size should preferably range from about 0.005 to 5 micron, more preferably from about 0.01 to 0.3 micron, and most preferably from about 0.03 to 0.16 micron.

In certain preferred embodiments, the pigment or pigments are self-dispersing. Such pigments include all chemically-modified, water-dispersible pigments known for use in ink-jet printing. Self-dispersing pigments are typically prepared by covalently adding one or more organic molecules comprising at least one aromatic group (e.g., but not limited to phenyl or naphthyl) or a $C_1$-$C_{12}$ alkyl group and at least one ionic group. The aromatic group may be optionally substituted, e.g., within one or more $C_1$-$C_6$ alkyl groups. The ionic group may be anionic or cationic. Exemplary ionic groups include sulfonic acid, sulfinic acid, phosphonic acid, carboxylic acid, ammonium, quaternary ammonium, and phosphonium groups. Those skilled in the art will appreciate that this is a non-limiting list.

Depending on the ionic group selected, the modified pigment will be anionic or cationic in character. Pigments that have been modified with anionic groups are usually associated with sodium or potassium cations, while pigments that have been modified with cationic groups are usually associated with chloride or sulfate anions. Reference is made to U.S. Pat. Nos. 5,707,432; 5,630,868; 5,571,311 and 5,554,739 for a discussion of modified black pigments and methods of preparing these. Reference is also made to U.S. Pat. Nos. 6,506,245; 6,494,943; 6,398,858; 5,922,118 and 5,837,045 for a discussion of modified colored pigments and methods of preparing these.

In certain other embodiments unmodified pigments are dispersed in the ink composition with the aid of a dispersant. The dispersant can be anionic, cationic or non-ionic. Ionic dispersants include both ionic and hydrophobic moieties. Suitable anionic dispersants include, but are not limited to, polymers and copolymers of styrene sulfonate salts, naphthalene sulfonate salts, copolymers of unsubstituted and substituted (e.g., alkyl, alkoxy, etc.) naphthalene sulfonate salts and an aldehyde derivative (e.g., alkyl aldehyde derivatives including formaldehyde, acetaldehyde, propylaldehyde, etc.), polymers and copolymers comprising acrylic acid salts, methacrylic acid salts, or maleic acid salts (e.g., styrene-acrylic acid copolymers, styrene-acrylic acid-alkyl acrylate copolymers, styrene-maleic acid copolymers, and styrene-maleic acid-acrylic acid copolymers). Useful cationic dispersants generally comprise substituted or unsubstituted ammonium salts, e.g., copolymers of N,N-dimethylaminoethyl methacrylate, N,N-dimethylaminoethyl acrylate, N,N-dimethylaminopropyl methacrylate, N,N-dimethylaminopropyl acrylate, N,N-dimethylacrylamide, N,N-dimethylmethacrylamide, N,N-dimethylaminoethylacrylamide, N,N-dimethylethylmethacrylamide, N,N-dimethylaminopropylacrylamide, and N,N-dimethylaminopropylmethacrylamide. Nonionic dispersants include both hydrophilic and hydrophobic moieties. Suitable nonionic dispersants include, but are not limited to, ethoxylated monoalkyl or dialkyl phenols. Nonionic dispersants can be used alone or in combination with the aforementioned ionic dispersants. For a more complete discussion of dispersants commonly used with pigments, see U.S. Pat. No. 6,500,875.

A variety of suitable pigments are available commercially. Without limitation, these include the MONARCH® and CAB-O-JET® series from Cabot; the RAVEN® series from Columbian; the PRINTEX® series from Degussa; the PALIOGEN® and HELIOGEN® series from BASF; the CHROMOPHTAL® and MONASTRAL® series from Ciba Speciality Chemicals; the TI-PURE® series from E.I. du Pont de Nemours; and the NOVOPERM®, HANSA® and HOSTAPERM®) series from Clariant.

Water-Miscible Organic Co-Solvents

The ink compositions include from about 0 to 30%, more preferably, from about 0.5 to 20%, and most preferably, from about 1.5 to 15% of a water-miscible organic co-solvent or a mixture of miscible organic co-solvents. Representative water-miscible organic co-solvents that may be selected are disclosed in U.S. Pat. No. 5,085,698 the contents of which are incorporated herein by reference.

In one preferred embodiment the organic co-solvent is selected from 2-pyrrolidone derivatives having formula (V) and imidazolidinone derivatives having formula (VI):

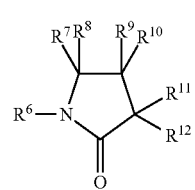

(V)

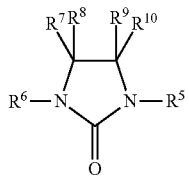

(VI)

wherein $R^5$, $R^6$, $R^7$, $R^8$, $R^9$, $R^{10}$, $R^{11}$ and $R^{12}$ are each independently selected from the group consisting of hydrogen and $C_1$-$C_6$ aliphatic groups. The $C_1$-$C_6$ aliphatic groups may saturated or unsaturated and may be linear, branched or cyclic. In certain embodiments the $C_1$-$C_6$ aliphatic groups may be substituted with one or more hydroxyl groups, e.g., 1, 2, 3 or more hydroxyl groups. Preferably $R^5$, $R^6$, $R^7$, $R^8$, $R^9$, $R^{10}$, $R^{11}$ and $R^{12}$ are each independently selected from the group consisting of hydrogen and $C_1$-$C_3$ aliphatic groups (optionally substituted with 1-2 hydroxyl groups). In yet other preferred embodiments $R^7$, $R^8$, $R^9$, $R^{10}$, $R^{11}$ and $R^{12}$ are hydrogen and $R^5$ and $R^6$ are methyl groups. Preferred derivatives of formula (V) or (VI) are 2-pyrrolidone, N-methyl-2-pyrrolidone and 1,3-dimethyl-2-imidazolid inone.

In another preferred embodiment the organic co-solvent is selected from hydantoin derivatives having formula (VII):

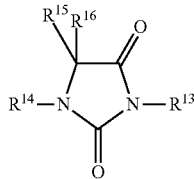

(VII)

wherein $R^{13}$, $R^{14}$, $R^{15}$ and $R^{16}$ are each independently selected from the group consisting of hydrogen and $C_1$-$C_6$ aliphatic groups. The $C_1$-$C_6$ aliphatic groups may saturated or unsaturated and may be linear, branched or cyclic. In certain embodiments the $C_1$-$C_6$ aliphatic groups may be substituted with one or more hydroxyl groups, e.g., 1, 2, 3 or more hydroxyl groups. Preferably $R^{13}$, $R^{14}$, $R^{15}$ and $R^{16}$ are each independently selected from the group consisting of hydrogen and $C_1$-$C_3$ aliphatic groups (optionally substituted with 1-2 hydroxyl groups). In one embodiment at least one of $R^{13}$ and $R^{14}$ is a $C_1$-$C_3$ alkyl group substituted with a single hydroxyl group, e.g., a hydroxyethyl group. In another embodiment at least one of $R^{15}$ and $R^{16}$ is an unsubstituted $C_1$-$C_3$ alkyl group, e.g., a methyl group. A preferred derivative of formula (VII) is di-(2-hydroxyethyl)-5,5-dimethylhydantoin available from Lonza Inc. as DANTOCOL® DHE.

In one preferred embodiment the ink compositions include a mixture of a 2-pyrrolidone or imidazolidinone derivative having formula (V) or (VI) and a hydantoin derivative having formula (VII), e.g., a mixture of 2-pyrrolidone and di-(2-hydroxyethyl)-5,5-dimethylhydantoin.

Additives

Certain additives may be optionally included to improve various properties of the ink compositions. Typical additives include biocides, chelating agents, buffers, antioxidants, ultraviolet absorbers and rheology modifiers.

Any of the biocides commonly employed in ink-jet inks may optionally be employed in the practice of the invention, including without limitation NUOSEPT® 95 from Degussa; PROXEL® GXL from Avecia; and glutaraldehyde from Dow Chemical as UCARCIDE® 250. PROXEL® GXL is the preferred biocide. The inks of the present invention optionally comprise from about 0 to 1.5% biocide. More preferably, the inks comprise from about 0.1 to 0.5% biocide, with a concentration from about 0.1 to 0.3% being the most preferred.

Metal chelators optionally employed in the ink compositions of the invention are used to bind transition metal cations that may be present in the ink. Examples of preferably-employed metal chelators include ethylenediaminetetraacetic acid (EDTA), diethylenetriaminepentaacetic acid (DTPA), trans-1,2-diaminocyclohexanetetraacetic acid (CDTA), (ethylenedioxy)diethylenedinitrilotetraacetic acid (EGTA), or other chelators that can bind transition metal actions. More preferably, EDTA, and DTPA, and most preferably, EDTA in its disodium salt form is employed in the practice of the invention. The inks of the present invention optionally comprise about 0 to 1.5% metal chelator. More preferably, the inks comprise from about 0 to 0.5% metal chelator, with a concentration from about 0 to 0.3% being the most preferred.

Buffers optionally employed in the practice of the invention to modulate pH can be organic-based biological buffers or inorganic buffers, preferably, organic-based. Without limitation, the buffers employed should provide a pH ranging from about 8 to 10 in the practice of the invention, preferably about 8.5 to 9.5. Any basic buffer may be used for this purpose. Examples of preferably-employed basic buffers include TRIZMA®), TRICINE®, 2-amino-2-methyl-1,3-propanediol (AMPD), 3-([1,1-dimethyl-2-hydroxyethyl]amino)-2-hydroxypropanesulfonic acid (AMPSO), 2-(cyclohexylamino)ethanesulfonic acid (CHES), etc. all of which are available from Sigma-Aldrich. The inks of the present invention optionally comprise about 0 to 1.5% buffer. More preferably, the inks comprise from about 0 to 0.5% buffer, with a concentration from about 0 to 0.3% being the most preferred.

Antioxidants and ultraviolet absorbers, which may be added to the ink, include members of the TINUVIN® series, the IRGACOR® series and the IRGANOX® series all from Ciba Specialty Chemicals, and lanthanide oxides.

Preparation of an Ink Composition

The invention will now be described with particular reference to certain preferred embodiments of the methods for preparing the ink compositions of the invention. In general, the ink compositions are prepared by mixing the selected water-soluble polyurethane(s), 1,2-alkyldiol(s) and pigment(s) in water or in a mixture of water and one or more water-miscible organic co-solvents. If a non-self dispersing pigment is used, a pigment dispersant may be added to the mixture as is well known in the art. When using a non-self dispersing pigment, any deflocculating method may be used. For example, the deflocculating step may be accomplished in a horizontal mini mill, a ball mill, an attritor, or by passing the mixture through a plurality of nozzles within a liquid jet interaction chamber at a liquid pressure of at least 1000 psi to produce a uniform dispersion of pigment particles. Other additives, such as biocides, chelating agents, buffers, antioxidants, ultraviolet absorbers and rheology modifiers may be added to the ink for conventional purposes.

It is generally desirable to make the ink composition in a concentrated form, which is subsequently diluted to the appropriate concentration for use in the ink-jet printing system. This technique permits preparation of a greater quantity of ink from the equipment. By dilution, the ink is adjusted to the desired viscosity, color, hue and saturation density for the particular application.

As noted in the background section, jet velocity, droplet separation length, drop size and stream stability are greatly affected by the viscosity and surface tension of the ink. This is particularly true when inks are ejected at high frequencies. Ink drytime is also affected by the viscosity and surface tension of the ink. As illustrated in the following examples, and without limitation, the inks of the present invention are unusually stable at high ejection frequencies. In addition the inks exhibit very short drytimes. Generally, the ink compositions of the present invention should have a viscosity at 25° C. in the range of about 1.5 to 6 cps, more preferably, in the range of about 2 to 3.4 cps. Acceptable surface tensions at 25° C. are in the range of about 18 to 45 dynes/cm, preferably in the range of about 21 to 37 dynes/cm.

EXAMPLES

For the purposes of illustration only, the physical properties and test performance of the ink compositions that are set forth in the following table were analyzed (all percents are by weight based on the total weight of the ink unless otherwise indicated).

|  | Ink A | Ink B | Ink C | Ink D | Ink E |
|---|---|---|---|---|---|
| Component |  |  |  |  |  |
| [1]CAB-O-JET ® 300 | 3 | 3 | 3 | 3 | 3 |
| [2]DANTOCOL ® DHE | 6 | 6 | 6 | 6 | 6 |
| 2-pyrrolidone | 7 | 7 | 7 | 7 | 7 |
| [3]PROXEL ® GXL | 0.20 | 0.20 | 0.20 | 0.20 | 0.20 |
| Water | balance | balance | balance | balance | balance |
| [4]Polyurethane | 0.00 | 1.20 | 1.20 | 1.80 | 1.20 |
| [5]JONCRYL ® 586 | 1.80 | 0.80 | 0.80 | 0.00 | 0.80 |
| [6]ZONYL ® FSO | 0.20 | 0.02 | 0.00 | 0.00 | 0.00 |
| [7]SURFYNOL ® 61 | 1.00 | 0.10 | 0.00 | 0.00 | 0.00 |
| 1,2-hexanediol | 4 | 4 | 4 | 1 | 1 |
| Physical Properties |  |  |  |  |  |
| Viscosity, cps | 2.45 | 2.52 | 2.36 | 2.03 | 2.38 |
| Surface tension, dynes/cm | 21.10 | 33.27 | 35.57 | 35.69 | 36.47 |
| Test Results |  |  |  |  |  |
| [8]Optical density | 1.40 | 1.48 | 1.45 | 1.54 | 1.46 |
| Drytime, sec | 5 | 3 | 3 | 3 | 7 |
| Steady state frequency, kHz | 8 | 17 | 20 | 24 | 25 |

[1]Jet black aqueous pigment dispersion (surface carboxylated) from Cabot.
[2]Hydantoin derivative (di-(2-hydroxyethyl)-5,5-dimethylhydantoin) from Lonza.
[3]Biocide (1,2-benzisothiazolin-3-one in dipropylene glycol) from Avecia.
[4]Water-soluble polyurethane polymer (AN 55, MW 6000) from Avecia (NBZ 3570/60).
[5]Styrene-acrylic polymer (AN 105, MW 4600) from Johnson Polymer.
[6]Ethoxylated non-ionic fluorosurfactant from E.I. du Pont de Nemours.
[7]Non-ionic surfactant (3,5-dimethyl 1-hexyn-3-ol) from Air Products and Chemicals.
[8]Relative values as measured vs. a standard with a spectrophotometer.

Ink Preparation

The ink vehicle was first prepared by mixing all the non-pigment components that are listed in the table. A 10-15% aqueous pigment dispersion was prepared in a separate container. The vehicle was subsequently added drop wise into the pigment dispersion while stirring until the desired pigment concentration was obtained. Finally the pH was adjusted to lie within the range of about 8.5 to 9.5 by adding a small amount of potassium hydroxide.

Physical Properties

The viscosity and surface tension of the ink compositions were measured using standard procedures and are shown in the table. The surface tension of the inks increased by nearly 70% when the surfactant component was removed (compare ink A with inks C, D and E). Also of note, replacing the styrene-acrylic polymer (AN 105, MW 4600) with the lower acid number polyurethane polymer (AN 55, MW 6000) caused the viscosity of the ink to drop by about 15% (compare inks D and E).

Test Results

A series of standard tests were performed with each ink composition in order to assess their drytimes and performance at different firing frequencies. The results are shown in the table. Drytime was measured by printing a predetermined pattern on bond paper (COPYPLUS® from Hammermill) and then wiping with a wiper after a delay. The test was repeated with increasing delays until no ink was transferred by the wiper. Firing performance was determined by measuring the average drop weight at increasing firing frequencies. The steady state frequency is a measure of the ejection frequency above which drop weight begins to decrease.

Of note, the steady state frequency increased three fold when the surface tension of the inks was increased (compare inks A and E); however, the increase in surface tension also increased the drytime. The drytime was reduced by increasing the 1,2-alkyldiol concentration; however, this change also caused the steady state frequency to drop by about 20% (compare inks C and E). The optimal combination of short drytime and high steady state frequency was obtained by increasing the concentration of the water-soluble polyurethane component while maintaining the 1,2-alkyldiol concentration (compare inks D and E).

OTHER EMBODIMENTS

Other embodiments of the invention will be apparent to those skilled in the art from a consideration of the specification or practice of the invention disclosed herein. For example, it will be appreciated that the inventive inks may be printed on a print medium alone or in combination with a fixer formulation. For example, the ink may be under- or over-printed with a fixer formulation that includes an acid or multivalent salt as is known in the art. It will further be appreciated that the inventive inks may be printed on plain paper or coated paper. It is intended that the specification and examples be considered as exemplary only, with the true scope of the invention being indicated by the following claims.

What is claimed is:

1. An ink composition, comprising:
   from about 0.1 to 5% by weight of a resin, the resin being a water-soluble polyurethane having a water-solubility limit of at least 0.1% at 25° C., and the water-soluble polyurethane having a weight average molecular weight ranging from 4,000 Da to 10,000 Da;
   from about 0.1 to 1% by weight of a 1,2-alkyldiol having 5-9 carbon atoms;
   from about 0.5 to 6% by weight of a self-dispersed pigment; and
   a balance of water.

2. The ink composition of claim 1 wherein the self-dispersed pigment is present at a concentration in the range of about 2% to 4% by weight, and wherein the water-soluble polyurethane is present at a concentration in the range of about 0.5% to 3% by weight.

3. The ink composition of claim 1 wherein the water-solubility limit of the water-soluble polyurethane is greater than about 5% at 25° C.

4. The ink composition of claim 1 wherein the water-soluble polyurethane has an acid number in the range of about 30 to 70.

5. The ink composition of claim 1 wherein the 1,2-alkyldiol is 1,2-pentanediol.

6. The ink composition of claim 1 wherein the 1,2-alkyldiol is 1,2-hexanediol.

7. The ink composition of claim 1, further comprising a water-miscible organic co-solvent or a mixture of water-miscible organic co-solvents.

8. The ink composition of claim 7 wherein the water-miscible organic co-solvent or mixture of water-miscible organic co-solvents is present at a concentration in the range of about 0.5 to 20%.

9. The ink composition of claim 7 wherein the water-miscible organic co-solvent is a 2-pyrrolidone derivative having formula (V) or an imidazolidinone derivative having formula (VI):

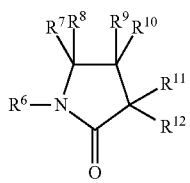
(V)

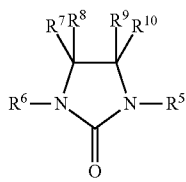
(VI)

wherein $R^5$, $R^6$, $R^7$, $R^8$, $R^9$, $R^{10}$, $R^{11}$ and $R^{12}$ are each independently selected from the group consisting of hydrogen and $C_1$-$C_6$ aliphatic groups; and wherein any $C_1$-$C_6$ aliphatic groups are optionally substituted with one or more hydroxyl groups.

10. The ink composition of claim 7 wherein the water-miscible organic co-solvent is a hydantoin derivative having formula (VII):

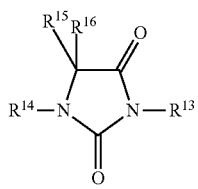
(VII)

wherein $R^{13}$, $R^{14}$, $R^{15}$ and $R^{16}$ are each independently selected from the group consisting of hydrogen and $C_1$-$C_6$ aliphatic groups; and wherein any $C_1$-$C_6$ aliphatic groups are optionally substituted with one or more hydroxyl groups.

11. The ink composition of claim 7 wherein the mixture of water-miscible organic co-solvents comprises a mixture of 2-pyrrolidone and di-(2-hydroxyethyl)-5,5-dimethylhydantoin.

12. The ink composition of claim 1 having a viscosity in the range of about 1.5 to 6 cps and a surface tension in the range of about 18 to 45 dynes/cm.

13. The ink composition of claim 1 having a viscosity in the range of about 2 to 3.4 cps and a surface tension in the range of about 21 to 37 dynes/cm.

14. The ink composition of claim 1 having a pH in the range of about 8 to 10.

15. The ink composition of claim 1 having a pH in the range of about 8.5 to 9.5.

16. The ink composition of claim 1 with the proviso that no surfactant is present in the ink composition.

17. A process for printing an image on a print medium comprising applying thereto an ink according to claim 1, by means of an ink-jet printer.

18. The process of claim 17 wherein the print medium is a plain paper or a coated paper.

19. An ink-jet printer cartridge containing an ink according to claim 1.

20. The ink composition of claim 1 wherein the water-solubility limit of the water-soluble polyurethane is at least 10% at 25° C.

21. The ink composition of claim 1 wherein the water-soluble polyurethane has a weight average molecular weight in the range of about 4,000 to 7,000 Da.

22. The ink composition of claim 1 wherein the water-soluble polyurethane has an acid number in the range of about 40 to 60.

23. An ink composition, comprising:
   about 1.8% by weight of a water-soluble polyurethane resin having a weight average molecular weight of about 6000 and an acid number of about 55;
   about 13% by weight of a solvent;
   about 1% by weight of 1,2-hexanediol;
   about 3% by weight of a self-dispersed pigment; and
   a balance of water.

* * * * *